United States Patent
Douthit

(10) Patent No.: US 12,147,883 B1
(45) Date of Patent: Nov. 19, 2024

(54) AUTOMATED USER EXPERIENCE ORCHESTRATION USING NATURAL LANGUAGE BASED MACHINE LEARNING TECHNIQUES

(71) Applicant: Ronnie Douglas Douthit, Trinidad, TX (US)

(72) Inventor: Ronnie Douglas Douthit, Trinidad, TX (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 18/432,321

(22) Filed: Feb. 5, 2024

Related U.S. Application Data

(62) Division of application No. 18/345,622, filed on Jun. 30, 2023, now Pat. No. 11,928,569.

(51) Int. Cl.
*G06N 20/00* (2019.01)
*G06F 40/284* (2020.01)

(52) U.S. Cl.
CPC ........... *G06N 20/00* (2019.01); *G06F 40/284* (2020.01)

(58) Field of Classification Search
CPC .............................. G06F 40/284; G06N 20/00
See application file for complete search history.

(56) References Cited

U.S. PATENT DOCUMENTS

| | | | |
|---|---|---|---|
| 10,630,840 B1 | 4/2020 | Kapr et al. | |
| 11,516,158 B1* | 11/2022 | Luzhnica | G06F 40/35 |
| 12,010,076 B1* | 6/2024 | Andrew | H04L 51/046 |
| 2013/0311166 A1 | 11/2013 | Yanpolsky | |
| 2014/0156282 A1 | 6/2014 | Madere et al. | |
| 2014/0222436 A1 | 8/2014 | Binder et al. | |
| 2017/0315791 A1 | 11/2017 | Mascaro et al. | |
| 2018/0113857 A1* | 4/2018 | Mora López | G06F 9/4881 |
| 2018/0268023 A1 | 9/2018 | Korpusik et al. | |
| 2018/0349769 A1* | 12/2018 | Mankovskii | G06N 3/08 |
| 2019/0042561 A1 | 2/2019 | Kakirwar et al. | |
| 2020/0104175 A1 | 4/2020 | Theimer et al. | |
| 2020/0202847 A1 | 6/2020 | Mukherjee et al. | |
| 2020/0234143 A1* | 7/2020 | Yoon | G06N 3/045 |
| 2021/0109752 A1 | 4/2021 | Kang et al. | |
| 2023/0139397 A1* | 5/2023 | Zhong | G06F 40/30 704/9 |
| 2024/0273286 A1* | 8/2024 | Lu | G06N 3/0475 |

* cited by examiner

*Primary Examiner* — Eric Yen
(74) *Attorney, Agent, or Firm* — Patterson + Sheridan, LLP

(57) ABSTRACT

Certain aspects of the present disclosure provide techniques for orchestrating a user experience using natural language input. A user experience is orchestrated within an ecosystem of features for which a plurality of corresponding tokens is defined. Natural language describing a desired user experience result is received by a user experience orchestrator. A sequence of tokens corresponding to operations belonging to an ecosystem of features which produce a correct result for the natural language input can be identified by a trained large language model and executed by the user experience orchestrator using a token operator. The output operations determined by the model to produce or be likely to produce the correct result based on the natural language input can be disambiguated, confirmed, and/or executed.

20 Claims, 8 Drawing Sheets

AUTOMATED USER EXPERIENCE ORCHESTRATION USING NATURAL LANGUAGE BASED MACHINE LEARNING TECHNIQUES

CROSS-REFERENCE TO RELATED APPLICATIONS

This Application is a divisional of co-pending U.S. patent application Ser. No. 18/345,622, filed Jun. 30, 2023, the contents of which are incorporated herein by reference in their entirety.

INTRODUCTION

Aspects of the present disclosure relate to automatically generating and orchestrating user experiences within an ecosystem using a language model trained to determine sequences of operations that achieve a desired result, based on natural language instructions describing the result, by executing the operations in a domain specific language of the ecosystem to produce the result.

BACKGROUND

Various complex ecosystems can include a large number of features which may be used or experienced by a user in any number of ways or in any number of orders. For example, a user of a suite of web-based applications or of a social media platform ecosystem may have a large number of possible interactions with the ecosystem available. For a particular result or user experience to be achieved, many successive interactions with the ecosystem might be necessary. For example, navigating to and interacting with various features available within an ecosystem can require many different user interactions.

In some cases, achieving a desired result or user experience may be repetitive, tedious or time consuming, can be difficult to perform, may require prior knowledge of applications and features, may require skill or experience with the ecosystem, or may be prone to human error. Achieving a desired result or user experience often requires many steps or locating and using specific features in a large ecosystem where doing so is a non-trivial task. Particularly for very large ecosystems, the number of orders of possible combinations of operations to perform complex tasks is astronomical, so determining a correct result without user controlled input is practically impossible.

Accordingly, techniques are needed to improve automated user experience orchestration.

BRIEF SUMMARY

Certain embodiments provide a computer-implemented method for orchestrating a user experience. In various embodiments, the method comprises defining a plurality of tokens, the plurality of tokens each corresponding to one or more ecosystem operations of a universe of ecosystem operations, each ecosystem operation of the universe of ecosystem operations being associated with a command expressible in a domain specific language of a computing ecosystem and able to be executed in the computing ecosystem; receiving a natural language instruction describing a correct result of the computing ecosystem; determining, using a machine learning model trained based on a plurality of prompts describing particular results of the computing ecosystem and a plurality of labels corresponding to sequences of one or more tokens of the plurality of tokens, that one or more subsets of the natural language instruction correspond to one or more sequences of one or more tokens of the plurality of tokens; and selecting, from the one or more sequences of one or more tokens, a sequence of one or more tokens such that the correct result described by the natural language instruction is produced by the computing ecosystem by a sequence of operations corresponding to the sequence of one or more tokens when commands associated with the sequence of operations are executed in the domain specific language in the computing ecosystem.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

Other embodiments also provide a computer-implemented method for training a language model, the method comprising: generating a training data set comprising: a plurality of prompts describing a particular result of a computing ecosystem, the computing ecosystem comprising a universe of ecosystem operations describing commands expressible in a domain specific language of the computing ecosystem and able to be executed in the computing ecosystem; and a plurality of labels corresponding to sequences of one or more tokens, each token of the sequences of one or more tokens corresponding to one or more operations of the universe of ecosystem operations; and training a machine learning model to generate one or more recommended sequences of tokens that achieve a selected result in the computing ecosystem based on the training data set, wherein the training of the machine learning model comprises: providing inputs to the machine learning model based on the plurality of prompts, receiving outputs from the machine learning model based on the inputs, and iteratively adjusting parameters of the machine learning model based on comparing the outputs to the plurality of labels.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
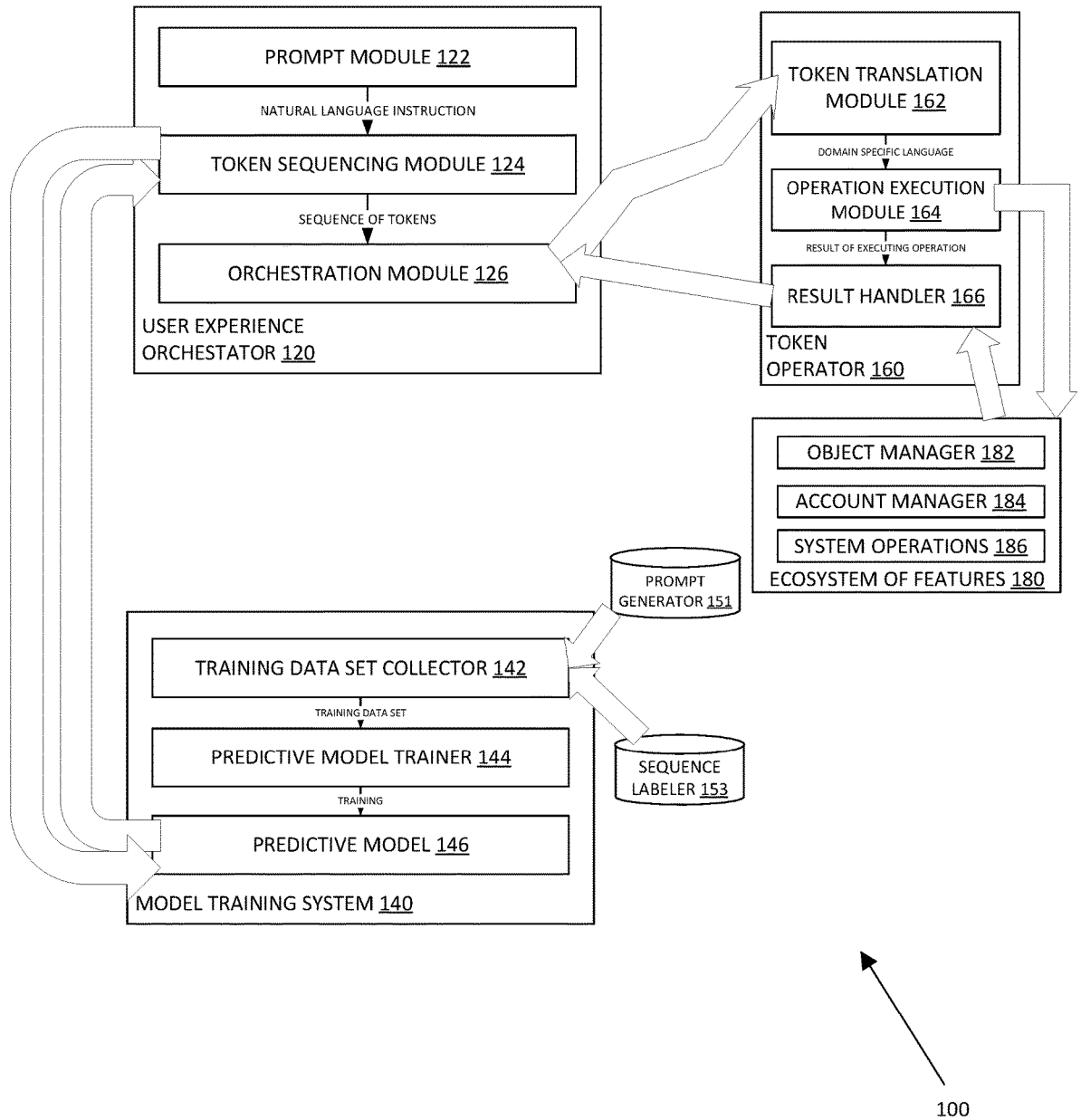
FIG. 1 illustrates an example computing environment in which a user experience is automatically orchestrated using natural language based machine learning techniques, according to embodiments.

Generating custom content for an ecosystem having many applications and functions is a time-consuming and difficult process, possibly requiring familiarity with many different facets of the ecosystem. By tokenizing the universe of ecosystem commands, sequences of tokens can be used to represent the operations of the ecosystem. The number of possible sequences is virtually unlimited. By tokenizing the commands and building a language model to automatically interpret natural language to generate sequences of tokens, a sequence of tokens producing a desired outcome can be generated despite there being almost no limit to the number of possible sequences.

Using training data including prompts and labelled sequences of tokens, a language model can be built that recognizes natural language input and generates sequences of tokens which, when executed in the domain specific language of the ecosystem, produce the result described by the natural language. In response to natural language input, a sequence of tokens can be output by such a model that can be used to orchestrate the described result.

Such a language model can be built from scratch, using the tokenized versions of the universe of ecosystem operations to generate sequences used for training data, along with training data for prompts, which may be synthetically generated, algorithmically generated, etc., and/or which can be given one or more scores related to labels associated with the sequences of tokens.

Thus, instead of having to navigate through many features of different applications to create objects in or make updates or changes to the ecosystem as in conventional software applications, embodiments of the present disclosure allow a user to simply provide natural language input in order to cause applications to automatically perform correct sequences of operations to, for example, generate a report with specified parameters, create a set features of an account, etc. Thus, techniques described herein save the user from spending time navigating to different features, and reduce computing resource utilization by enabling application features to be accessed without loading separate user interface screens and/or without intermediate steps that would otherwise be required to access the resource (scrolling, moving a mouse, clicking, navigating through an application, loading and displaying content, etc.). Therefore, aspects of the present disclosure provide techniques for automatically orchestrating a user experience using natural language to achieve a desired result by automatically executing a sequence of commands in response to natural language instruction being input into a user experience orchestrator, as opposed to traditional methods requiring manual performance of the instruction and requiring the utilization of computing resources associated with many intermediate stages of application navigation. Embodiments of the present disclosure, therefore, improve the functioning of computing devices by reducing the amounts of computing resources required to access features of software applications and improve the functionality and usability of software applications by allowing features to be accessed in a more efficient and intuitive manner.

Example User Experience Orchestration Using Natural Language Prompting

FIG. 1 illustrates an example computing environment 100 in which user experiences are orchestrated using natural language. As illustrated, the example computing environment 100 includes a user experience orchestrator 120, a model training system 140, a token operator 160, and an ecosystem of features 180 operable by the token operator 160.

In various embodiments, the user experience orchestrator 120 is an application or feature of an application, which may be local or web-based, and which is accessible by a user to generate or orchestrate user experiences. For example, a user may have accounts for or access to a suite of applications for which the conglomerate of features performed by the applications may be referred to as an ecosystem. Rather than individually accessing various applications of a suite, or individually accessing various features of an application, a user may instead use the user experience orchestrator 120 to execute operations associated with accessing the features in the ecosystem 180.

As used herein, an ecosystem of features includes, without limitation, account generation, user attribute management, object creation, object management, function performance, or any other executable task. For example, a task such as report generation for a user having an account with certain attributes, related objects, and including results of functions performed on the objects based on the user attributes could be performed by invoking a variety of features of the ecosystem to identify the user, retrieve values for the attributes, generate objects, perform calculations, etc. Examples of operations include creation of a new object based on an old object, changes to an attribute, performing calculations, etc. For example, a user of a suite of financial planning applications can generate financial reports or tax returns, and may generate new reports or returns based on previous reports or returns and one or more changes. In general, a feature of an ecosystem can also include filtering, identification, creation, deletion, management, organization, grouping, attribute assignment, attribute management, labeling, etc., or performing any other executable function. A feature may be a combination of features, and/or can be a single operation or a combination of operations or commands.

In FIG. 1, the user experience orchestrator 120 includes a prompt module 122, a token sequencing module 124, and an orchestration module 126. The user experience orchestrator 120 may be in communication with the model training system 140 and/or the token operator 160 to perform features of the ecosystem 180.

The prompt module prompts a user for input describing a desired result of the user. For example, a window of an application may include text requesting natural language input from the user related to performing one or more operations related to features of the ecosystem 180. In such examples, a user may input natural language requests such as "generate a financial report based on last year's report and a ten percent increase in income," or "generate a tax return based on last year's tax return with an additional dependent added" to generate financial reports or tax returns or generate new reports or returns based on previous reports or returns, including one or more changes, described using natural language instruction.

The prompt module 122 receives natural language instruction input from a user in response to the provided prompt and provides the natural language instruction to the token sequencing module 124. In embodiments, the provided prompt may be related to or provided by an application, which may be a part of or related to a suite of applications. The provided prompt of some embodiments may include a degree of detail describing generally what applications are able to be orchestrated by the orchestrator 120. The detail may be sufficient for a user to understand what features may be utilized in producing the result described by the natural language instruction. In other embodiments, however, the prompt may not include detail, or may be a null prompt, such as the case when the prompt module 122 reads input character-by-character. A user may indicate completion of inputting the natural language instruction, for example, by pressing "enter" on a keyboard or clicking a "submit" button, or the prompt module may read input on a character-by-character basis as the natural language instruction is input. In such embodiments, one or more results may be generated and presented to the user in real time. It is noted that while certain embodiments are described with respect to natural language instruction being input via text, other embodiments may involve natural language instruction being input via voice (e.g., captured via a microphone) and being processed using techniques such as natural language processing (NLP) to determine text of the natural language instruction.

The token sequencing module 124 receives the natural language instruction from the prompt module 122. In various embodiments, the token sequencing module provides the natural language instruction to a predictive model 146 that recommends, or provides a likelihood of correctness for, one or more sequences of tokens based on the natural language instruction used as input. The predictive model 146 of embodiments may be a machine learning model (e.g., a neural network or other type of machine learning model) that is trained through a supervised learning process based on labeled training data, as described in more detail below with respect to FIG. 5.

In a particular example, predictive model 146 is a large language model (LLM) such as a generative pre-trained (GPT) model. The predictive model 146 generates one or more sequences of tokens based on the natural language instruction provided by the token sequencing module 124 and provides the one or more sequences to the token sequencing module. In some embodiments, the token sequencing module 124 performs disambiguation and/or confirmation for one or more of the sequences and/or tokens.

In general, a model training system 140 can be used to train or fine-tune a predictive model, such as predictive model 146. In FIG. 1, the model training system includes a training data set collector 142 which may collect training data from various sources, such as a prompt generator 151 and a sequence labeler 153. A prompt generator may include features for generating synthetic prompts, such as by using an algorithm and tagged word bank, or generating prompts by sampling, randomly generating prompts, etc. The sequence labeler 153 includes features for labeling sequences of one or more tokens with one or more tags or labels indicating an association or relationship between tags and/or sequences.

As also discussed further below in regards to FIG. 6, in cases where the recommendation is ambiguous, such as two or more different sequences of tokens having the same probability of correctness in achieving the result described by the natural language input according to the model, the token sequencing model can provide a description of the two or more different sequences to the user so that the user can provide an indication of the correct sequence. In such embodiments, the token sequencing module will provide the indicated sequence of tokens to the orchestration module 126.

As also discussed further below in regards to FIG. 7, the token sequencing module may prompt the user for verification or confirmation of a token or sequence of tokens. In some cases, the user confirms an entire sequence is correct. In other cases, an indication is provided to the user that an operation related to the recommended sequence or to a token in the sequence corresponds to a destructive or consumptive operation and requests confirmation of the operation. For example, deleting an account or object, or performing a task that requires a cost such as consumption of a credit or purchasing or upgrading an application to gain access to a feature are considered consumptive operations. If the user indicates via input that the user does not wish the operation to be performed, an adjusted sequence can be generated omitting or replacing the operation and/or any operations dependent on the omitted or replaced operation. Once the sequence is confirmed or adjusted, the sequence is provided to the orchestration module 126.

In FIG. 1, the orchestration module 126 receives a sequence of tokens from the token sequencing module 124 and provides the sequence of tokens to a token translation module 162 of the token operator 160. The token translation module 162 receives the sequence of tokens and translates the sequence of tokens into a set of instructions in a domain specific language of the ecosystem 180. The domain specific language instructions include one or more operations executable in the ecosystem of features. The token translation module provides the domain specific language instructions to an operation execution module 164.

The operation execution module performs the operations associated with the domain specific language instruction on the ecosystem of features 180. Executing the operations may include invoking an object manager 182, an account manager 184, or various system operations 186, or any other executable function of the ecosystem 180 to perform various features of the ecosystem. Features can also include, but are not limited to, plugin operations, widget operations, or application programming interface (API) operations. In this way, various types features can be accessed or used.

In embodiments, the token operator 160 includes a result handler 166 for handling the results of executing the domain specific language instructions. The result handler receives the results from the ecosystem of features and may process or preprocess the results before providing the results to the orchestration module 126.

Thus, features of the example of FIG. 1 enable a user to achieve a desired result described by natural language by inputting into the user experience orchestrator natural language instruction describing the desired result, or how to generate the desired result, such as by using available features of an ecosystem.

Example User Experience Orchestration without Natural Language Instruction

Figure 2:
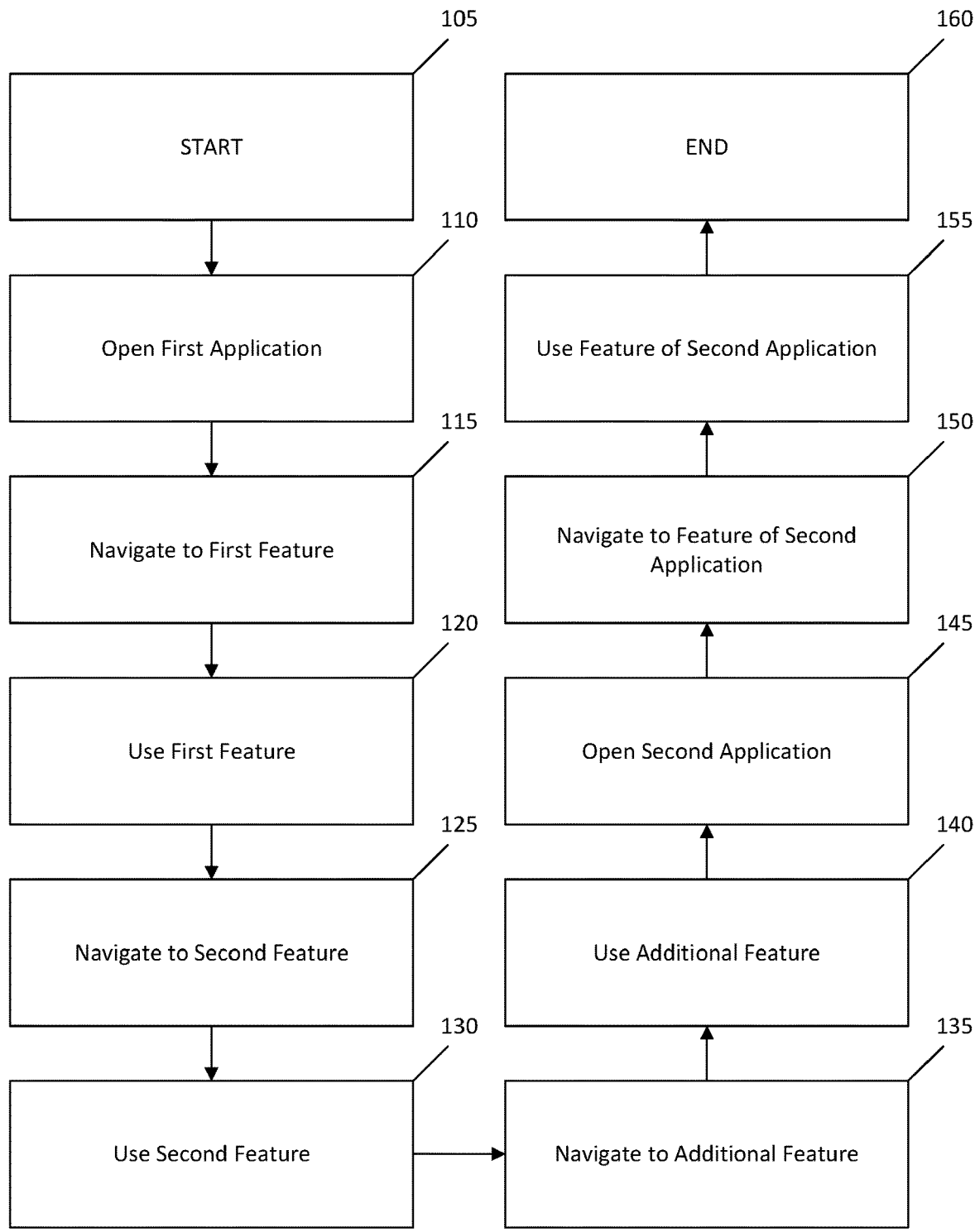
FIG. 2 is a flow chart illustrating a sequence of steps to perform ecosystem operations achieving a result without using natural language to orchestrate a user experience.

FIG. 2 is a flow chart illustrating a sequence of steps 200 to perform ecosystem operations achieving a result without using natural language to orchestrate a user experience, according to conventional techniques.

As illustrated, operations 200 may begin at starting block 205 and proceed to block 210, where a user opens a first application. For example, a user may log in to an account for an application that is remotely hosted or installed locally on a user computing device and which can perform any number of functions known in computing, for example, creating or managing objects or assets belonging to an account, which may be a paid or authenticated account. As an example, a user may log in to a suite of applications for performing operations related to financial planning, banking, tax preparation and analysis, account management features, etc.

From block 210 where a user logs in to an application, the operations 200 may proceed to block 215 where the user navigates to a first feature. For example, a user may use a keyboard and/or mouse input to navigate to a particular feature of an application, such as clicking on a button or typing the name of a feature and pressing enter to instruct the application to open or generate a user interface allowing the user to access the feature.

From block 215 where the user navigates to the first feature, the operations 200 may proceed to block 220 where the first feature is used, such as to interact with or create data. A user may wish to view, create, alter, or otherwise access or change data associated with a data object, such as changing an account detail, creating profiles for an account, creating objects associated with profiles, adding or subtracting attributes associated with objects, or changing values for attributes, etc. In general, using features of an application may require multiple keyboard entries, mouse movements and/or clicks to perform multiple steps of navigation and interaction that need to be performed by a user. In a particular scenario, a user may use the user interface of the first feature navigated to at block 215 to prepare a tax return. Preparing a tax return in this example would generally require multiple mouse movements, clicks, and keyboard strokes to navigate to and input information into various fields for generation of the tax return.

From block 220 where the first feature is used, the operations 200 may proceed to block 225 where the user navigates to a second feature. In general, navigating between features of an application requires additional user input to transition to a user interface enabling access to the feature, such as scrolling, mouse movements, mouse clicks and/or keystrokes. Further, a user must manually locate and/or identify the correct interaction to cause the transition from the current user interface to a user interface enabling the second feature. For suites of applications having many features, or for an application with which a user is unfamiliar, locating and navigating to different features can be a time consuming process, often requiring trial and error to determine the location and navigate to the desired feature, especially for an application with many features or with which a user is unfamiliar.

From block 225 where the user navigates to the second feature, the operations 200 may proceed to block 230 where the second feature is used, such as to interact with or generate data. For example, a second feature can be used to alter or assign values to a data object created by using the first feature. Doing so may include, by way of non-limiting example, reading field labels to determine a correct field, navigating to the field, entering input into the field or changing a value for the field, submitting the input entered into the field, using a selector such as a drop-down menu or radio buttons to assign or change attributes of an object, etc. Generally, using a first feature and a second feature of an application requires navigation between the features within the application, in addition to each feature possibly requiring multiple user interactions to be used.

From block 230 where the second feature is used, the method 200 may proceed to block 235 where the user navigates to one or more additional features. From block 235 where the user navigates to one or more additional features, the method 200 may proceed to block 240 where the user uses the one or more additional features. Similarly to the first and second feature, using an additional feature of the application requires locating the additional feature, navigating to the additional feature, and further user interactions to use to the additional feature.

From block 240 where the user uses the one or more additional features, the method 200 may proceed to block 245 where the user navigates to a second application. For example, the second application may be a member of a suite of applications of which the first application is also a member. In various cases, the user must navigate from the first application to the second application, such as by typing, mouse movement, etc. to determine a file location or icon associated with the second application.

From block 245 where the user navigates to the second application, the operations 200 may proceed to block 250 where the user opens the second application. Generally, using features of the second application will require further steps from the user of locating the features, navigating to the features and interacting with the features. From block 250 where the user opens the second application, the operations 200 may conclude at ending block 255. In some embodiments, the user may optionally continue to use other applications and features, and may perform steps to navigate to, locate, open, and use the additional applications and features, after which the method can conclude at ending block 255.

The conventional process depicted in FIG. 2 is time-consuming, inefficient, and involves a significant amount of computing resource utilization, such as resource utilization relating to loading user interface screens and content associated with intermediate stages of accessing application features, receiving and processing user input, and the like. As such, embodiments of the present disclosure provide natural language based machine learning techniques for automated user experience orchestration in order to overcome these deficiencies of conventional software applications.

Figure 3:
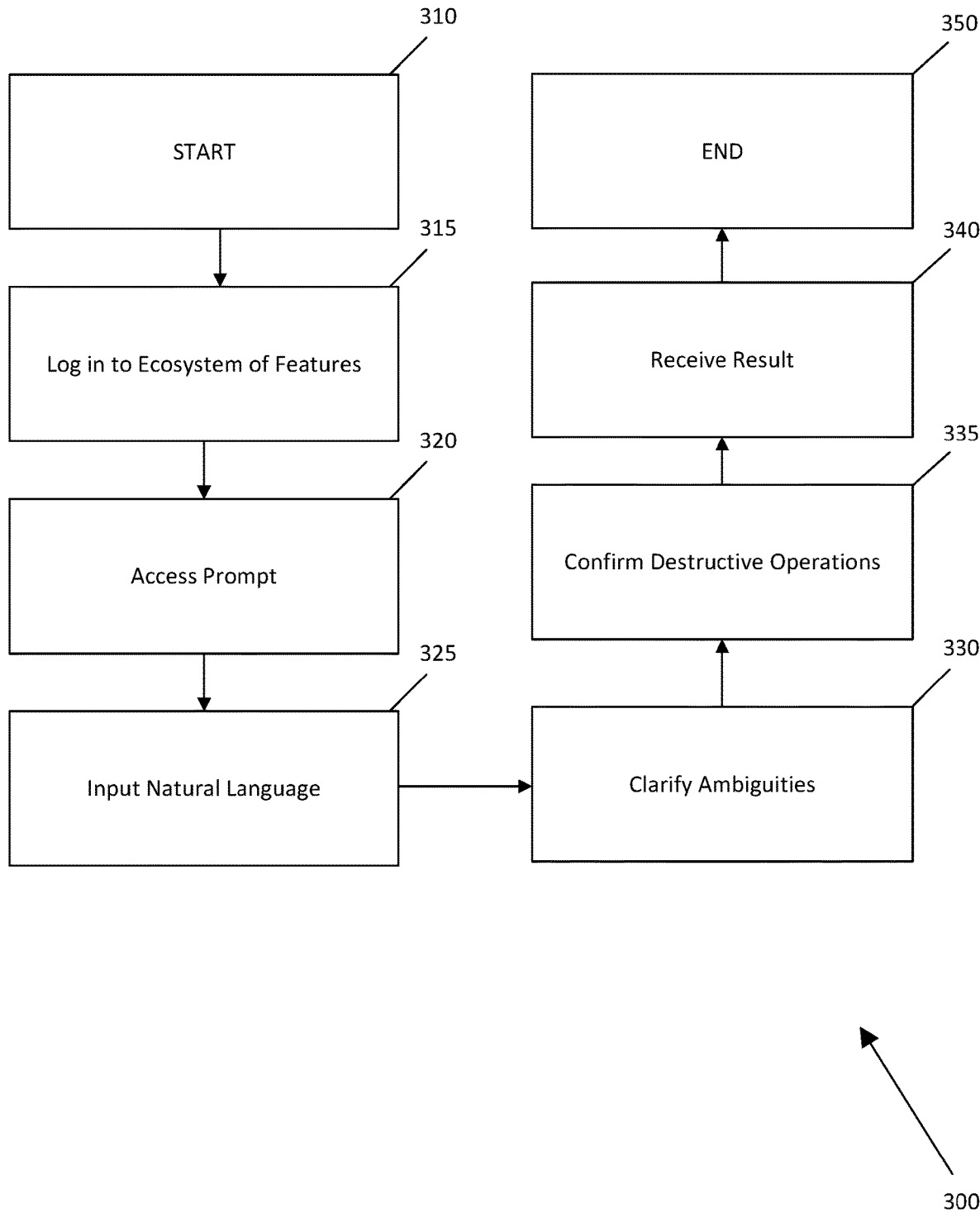
FIG. 3 is a flow chart illustrating a sequence of steps to perform ecosystem operations achieving a result using natural language to orchestrate a user experience.

Example System for User Experience Orchestration Using Natural Language Instruction FIG. 3 is a flow chart illustrating operations 300 involving a sequence of steps to perform ecosystem operations achieving a result using natural language to orchestrate a user experience.

As illustrated, operations 300 may begin at block 310, where a user accesses a user experience orchestrator. The user may log in to an application including the user experience orchestrator and/or other features, plugins, or widgets. A user experience orchestrator may be included in an application such as or similar to an application of the suite of applications of used by operations 200.

From block 310 where the user logs in to the application, the operations 300 may proceed to block 320 where a prompt is presented to the user. For example, upon opening the application or upon successful login, a prompt may be presented to the user requesting instruction input. The prompt may be detailed, such by including significant information or help items describing high-to-low level available applications and features available within the ecosystem to the user, or any other general description of the ecosystem and/or application and features of the ecosystem. The prompt may include suggestions such as a selection of features or applications for which a user is most likely to use, or example natural language instructions performing the suggested features or application. Alternatively, a prompt may be minimal (i.e. text requesting "enter instruction," or a flashing line), or a null prompt, such as in the case of generating results on an entry-by-entry basis for a stream of user text entries.

From block 320 where a prompt is presented to the user, the operations may proceed to block 330 where the user inputs natural language into a user experience orchestrator. For example, a user may use a computing device having a keyboard or microphone, such as a cell phone, personal computer, or laptop, etc., to access and input information into the user experience orchestrator. The natural language can be a description of a desired result to be generated, or instructions describing how to achieve a desired result, such as a description of desired attributes of the result, or a description of any other desired user experience.

From block 330 where the user inputs the natural language into the user experience orchestrator, the operations 300 may proceed to block 340 where the user clarifies ambiguities and/or confirms destructive operations. In some cases, a user may have to verify or disambiguate the natural language instruction input into the user experience orchestrator.

Although the user experience orchestrator can often receive, from a language model, a single sequence of tokens which has the greatest likelihood of producing a correct result, or a sequence of tokens which is preferred among a group of sequences each having a greatest likelihood, in some cases, more than one sequence with a significant likelihood of producing a correct result can be received. In such cases, the sequences also include a significant likelihood of producing an incorrect result and ambiguity exists as to which sequence produces the correct result. To solve the ambiguity, a description of each of the multiple sequences producing the different results can be presented to the user so that the user can provide an indication of which description describes or matches the correct result. A sequence of tokens corresponding to the description for which the indication is received may be sent to a token operator which executes the tokens according to the sequence and generates results based on executing the tokens. If needed, in certain embodiments, the sequence of tokens may also be validated, confirmed, or altered in various ways before the token operator operates the tokens.

In some cases, the user experience orchestrator may determine that one or more operations associated with the sequence of tokens is a destructive or consumptive operation, such as an operation including a command that consumes a paid credit, or that deletes an object or account, or otherwise destroys or disorganizes data. In this case, the user experience orchestrator may prompt the user for validation or confirmation, or for selection of an alternative non-consumptive or non-destructive option presented to the user.

From block 340 where the user clarifies ambiguities and confirms destructive operations, the operations 300 may proceed to block 345 where results are received. For example, one or more ecosystem features are used by the token operator as a sequence of operations corresponding to the sequence of tokens is executed to access and/or perform various functions and/or features of the ecosystem, including functions and features of any application within the suite of applications of the ecosystem. In a particular scenario, a user might enter natural language instruction such as "generate a tax return for this year based on information available in associated applications with a new dependent added and an increase to yearly income of 10%." In response, the user will be provided with a tax return that is automatically generated based on available information (such as previous tax returns generated by the application or financial data of associated applications within the suite of related applications) including an added dependent and reflecting an increase to yearly income of 10% on the new return. In other contexts, the natural language input may be a request for a recommendation or for performance of some computation or function. Multiple strategies may be available in the ecosystem, and a user may request a best strategy based on the natural language instruction, or other input by a user, and/or data available within the ecosystem.

As another example in the context of financial planning services, a user might input natural language instruction such as "create a new plan using the plan from last year with schedule C income increased by 5% and then convert that schedule C to an S corp and delete the old plan." In this example, the user experience orchestrator may require disambiguation between two plans from a previous year, or confirmation of the deletion of the old plan. However, it is noted that aspects of the present invention are not limited to financial planning services, but are rather applicable in various fields, including but not limited to: inventory systems, payroll systems, e-commerce systems, or other ecosystems.

From block 345 where the result of executing the sequence of operations is received, the operations 300 may conclude at ending block 350.

Although executing the sequence of operations corresponding to the natural language instruction in the example of FIG. 3 includes using multiple features associated with different applications, the operations 300 execute the domain specific language commands for each operation of the different features and applications based on the initial input instructions without generating and displaying multiple user interfaces for navigation between applications and features, and without requiring multiple steps of user location, navigation, selection, and/or interaction to perform the features, as would be required by traditional operations 200.

By way of example, in the context of a financial planning application, domain specific language commands might include one or more of the following: a select client function using a client id as an argument, a select return function using a return id as an argument, an adjust income function using an adjustment value as an argument, etc. In general, features of an application, such as selecting a client or profile, selecting an object such as a return, or adjusting values such as adjusting income, can be tokenized according to a domain specific language command related to the feature. Thus, a domain specific language may comprise any number of tokenizable functions and/or arguments. The number of tokens can be very large, but is definable by the totality of possible ecosystem operations. However, the number of possible user experiences able to be orchestrated by the ecosystem includes all possible sequences of such tokens, which is an astronomical amount that is prohibitively large to define or account for using traditional methods. However, using a trained language model, as disclosed herein, a user may obtain a sequence of tokens based on natural language instruction input that has a high probability of correctly achieving a correct or intended result of the natural language input.

Traditionally, such as by using operations 200, generating such a result would require many additional steps of calculation, user input, and navigation, such as navigating between features for generating tax returns, for inputting number of dependents, for inputting income level, navigating between windows and fields within windows, interacting with fields via clicking and keyboard input, etc. Instead, the user avoids additional steps of navigating between features and applications by inputting a single natural language instruction into the user experience orchestrator. This saves a significant amount of time and computing resources because any number of features can be performed, and applications accessed, without extra steps of navigation and locations, and without having to generate user interfaces or user interface elements enabling the user to interact with or navigate between features or applications. Thus, achieving the correct, desired result using operations 300 is faster, less prone to human error, and less resource intensive than traditional methods.

Figure 4:
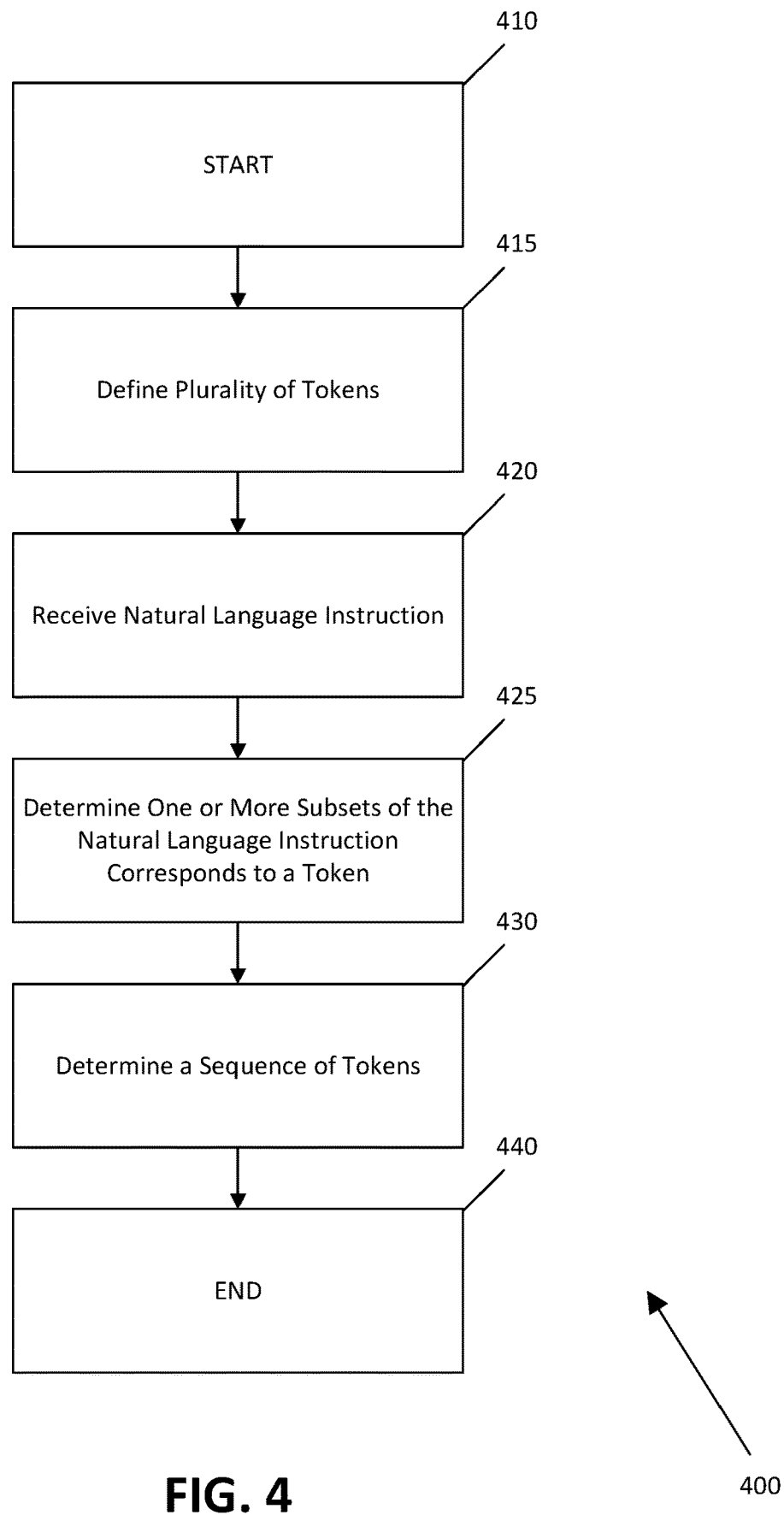
FIG. 4 is a flow chart illustrating an example method of automatically orchestrating a user experience using natural language based machine learning techniques, according to embodiments.

Example Method of Orchestrating a User Experience Using a Language Model and Natural Language Instruction FIG. 4 is a flow chart illustrating an example method 400 of orchestrating a user experience using natural language, according to embodiments.

As shown, the method 400 beings at starting block 410 and proceeds to block 415 where a plurality of tokens is defined. For example, an ecosystem of features can be tokenized at various granularities. In other words, a token can correspond to one operation or command, or multiple operations and commands. In general, tokens represent one or more actions, commands, or operations executable within an ecosystem of features provided to the user by a suite of related software applications. User interactions within the ecosystem result in a domain specific language instruction being executed. For example, selecting an item with a mouse may cause a domain specific language instruction related to the item selection to be executed. The totality of possible user interactions within an ecosystem of features may be definable according to the domain specific language instruction resulting from the interactions. Thus, a plurality of tokens representing each possible user interaction, or representing combinations of user interactions, can be defined based on the domain specific language instructions resulting from the totality of possible user interactions in the ecosystem.

From block 415 where the plurality of tokens is defined, the method 400 may proceed to block 420 where a natural language instruction is received. For example, a user of a computing device having a networked connection to a computing device hosting the user experience orchestrator may input a natural language instruction into the user computing device (i.e. a personal computer or smart phone). The host device receives the natural language instruction input at the user experience orchestrator and may process or preprocess the input or forward the input to a language model from which one or more sequences of tokens may be received.

From block 420 where the natural language instruction is received, the method 400 may proceed to block 425 where it is determined that one or more subsets of the natural language instruction corresponds to a token. In various embodiments, the natural language instruction is provided to a language model, such as a large language model (or "LLM") that is used to determine one or more recommended sequences of tokens determined to have a likelihood of producing a correct result described by the natural language instruction. In other words, the natural language instruction can be input into an LLM and processed by the LLM to generate one or more sequences of tokens predicted by the LLM to achieve the correct result by causing, when commands associated with the sequence of tokens are executed, a result that matches the result described by the natural language instruction.

From block 425 where one or more subsets of the natural language instruction are determined, the method 400 may proceed to block 430 where a sequence of tokens is selected. For example, an LLM may provide one or more sequences of tokens in response to natural language instruction input into the model. From the one or more sequences of one or more tokens, a sequence to be executed by a token operator is selected. In some cases, the one or more sequences of one or more tokens may require disambiguation or confirmation to determine a selected sequence of one or more tokens. The sequence to be executed may be selected from one or more sequences of tokens determined to produce the correct result based on the sequence being a best sequence, such as by being the fastest sequence, the least (computationally or monetarily) expensive sequence, the sequence requiring the fewest steps, or by being the most desirable sequence for some other reason.

In the case that more than one sequence is received, disambiguation may desirable. Also, in the case that a destructive operation is included, confirmation may be desirable. In any case, validation may be desirable. Once the user performs any disambiguation, confirmation, or validation, a final sequence of tokens to be executed is selected or determined according to the indication. From block 430, where the sequence of tokens is selected, the sequence of tokens can then optionally be executed or provided to a token operator for execution, or else the method 400 may proceed to conclude at ending block 440.

Figure 5:
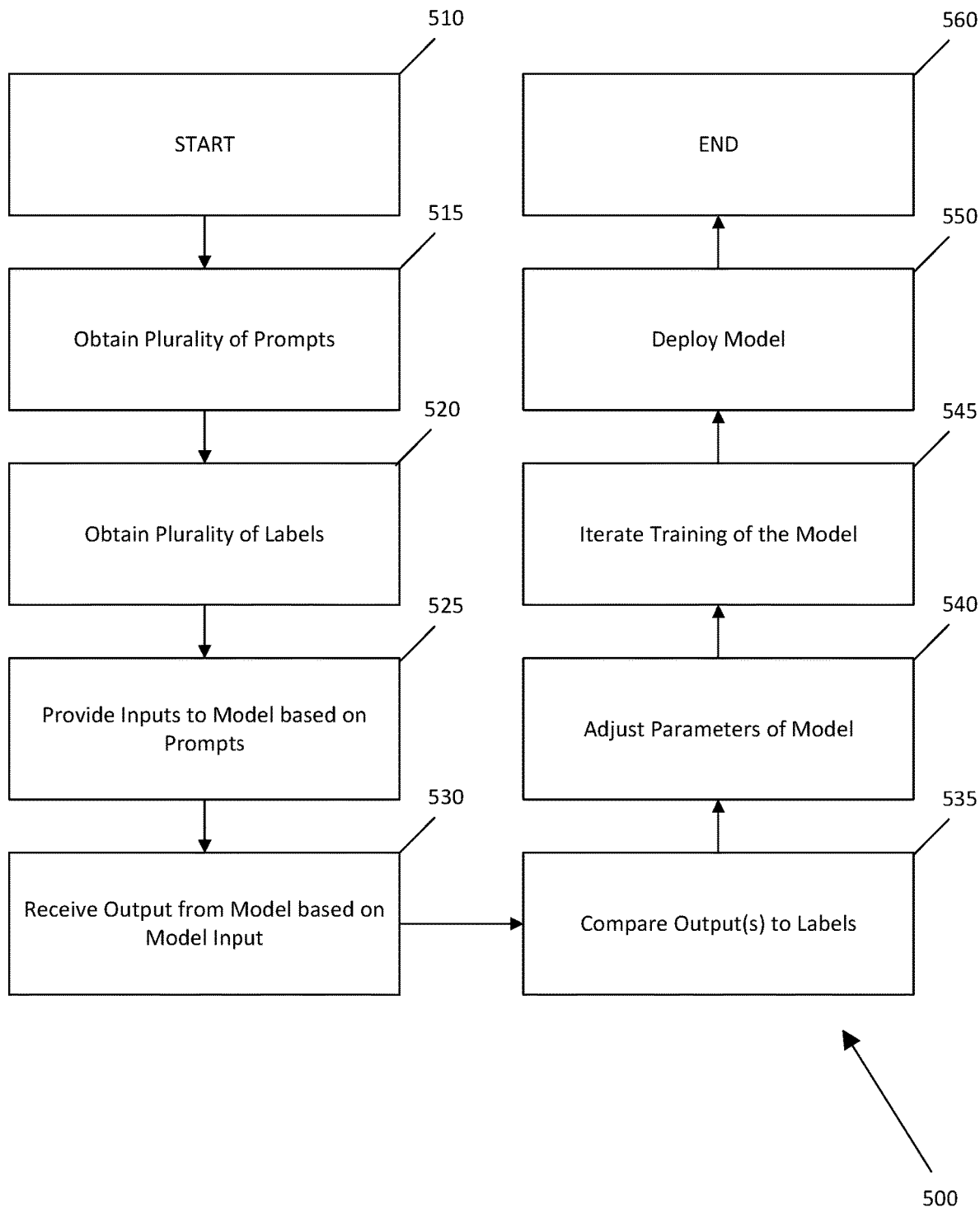
FIG. 5 is a flow chart illustrating an example method for providing a recommended sequence of ecosystem operations to a user experience orchestrator based on a machine learning model trained to identify sequences of operations achieving an ecosystem result described by natural language input, according to embodiments.

Example Method of Training a Language Model for Orchestrating a User Experience Using Natural Language Instructions FIG. 5 is a flow chart illustrating an example method 500 for training a machine learning model to identify sequences of operations achieving an ecosystem result described by natural language input, according to embodiments.

As shown, the method 500 beings at starting block 510 and proceeds to stage 515 where a plurality of prompts is obtained. A prompt can include a natural language description of one or more operations performable by an ecosystem of features. A prompt can also include words or commands that are not in natural language form. In various cases, prompts may be computer generated, synthetic prompts, such as instructions algorithmically generated to describe a result. Prompts may also be sampled from actual natural language user data describing a desired result. A plurality of prompts can be selected or obtained and used as training data for a language model.

From stage 515 where the plurality of prompts is obtained, the method 500 may proceed to stage 520 where a plurality of labels is obtained. A label can include one or more descriptions or attributes associates with an ecosystem operation. A label can also include or one more strings or numerical values with which the labeled item is or is not associated. In various cases, labels can be manually or automatically assigned to sequences of one or more respective tokens of a plurality of tokens associated with the operation. Labels can be predetermined descriptions of ecosystem commands, or labels may be sampled from a result set of executing one or more sequences of tokens associated with the label and indicating correctness or incorrectness. A plurality of labels can be selected or otherwise obtained and used as training data for the language model. A label associated with a given prompt (e.g., comprising a natural language description) can include a sequence of tokens that is confirmed (e.g., by a user) to achieve the desired result of the prompt.

From stage 520 where the plurality of labels is obtained, the method 500 may proceed to stage 525 where input is provided into a model based on the prompts. For example, the model may be a language model which provides an output, such as a sequence of tokens, based on input instructions. In various embodiments, a language model may be trained using the prompts and labels. Training of the language model can be "from scratch" or can be based on "fine tuning" of a pre-existing model where a large language model is further trained using prompts and labels as training data.

From stage 525 where the input is provided into the model based on the prompts, the method 500 may proceed to stage 530 where an output is received. An output may comprise a sequence of tokens corresponding to operations which may be executed to achieve a correct result based on the input, or which are determined to have a high likelihood of achieving a correct result. In some embodiments, an output may comprise a plurality sequences which are disambiguated or otherwise processed to determine one or more selected sequences.

From stage 530 where the output of the model is received, the method 500 may proceed to stage 535 where the output is compared to the labels. For each label, the output may include an indication of a degree of association with that label, such as whether the label is or is not associated with the output. In embodiments, the output may include a string, numerical value, or binary value respectively associated with one or more of the labels.

From stage 535 where the output is compared to the labels, the method 500 may proceed to stage 540 where parameters of the model are adjusted. Parameters associated with tokens, such as various attribute encodings, positional encodings, token affinities, and/or token context may be adjusted to improve accuracy of the model. For instance, the adjusting of parameters of the model may be based on evaluating an objective function (e.g., a cost function or loss function) for optimizing one or more variables (e.g., model accuracy). In some embodiments, one or more variables of such an objective function may relate to whether the predictions produced by the machine learning model based on the training inputs match the known labels associated with the training inputs or whether a measure of error between training iterations is not decreasing or not decreasing more than a threshold amount. The conditions may also include whether a training iteration limit has been reached. Parameters adjusted during training may include, for example, hyperparameters, values related to numbers of iterations, weights, functions used by nodes in a neural network to calculate scores, and the like.

From stage 540 where parameters of the model are adjusted, the method 500 may proceed to stage 545 where training of the model is iterated. By repeating steps of obtaining prompts and labels, providing input to a model, receiving output from the model, and comparing outputs of the model produced by using the inputs based on the prompts and using parameters adjusted based on a comparison of output of the model to the labels. In some embodiments, validation and testing are also performed for the model, such as based on validation data and test data, as is known in the art.

From stage 545 where training of the model is iterated, the method 500 may proceed to stage 550 where the model is deployed. For example, the model may be deployed to provide output in the form of a sequence of tokens in response to receiving input in the form of natural language instruction describing a result. The sequence of tokens is determined such that the result of executing operations associated with the sequence of tokens is a correct result for the natural language instructions. From stage 550 where the model is deployed, the method 500 may conclude at ending block 560.

Figure 6:
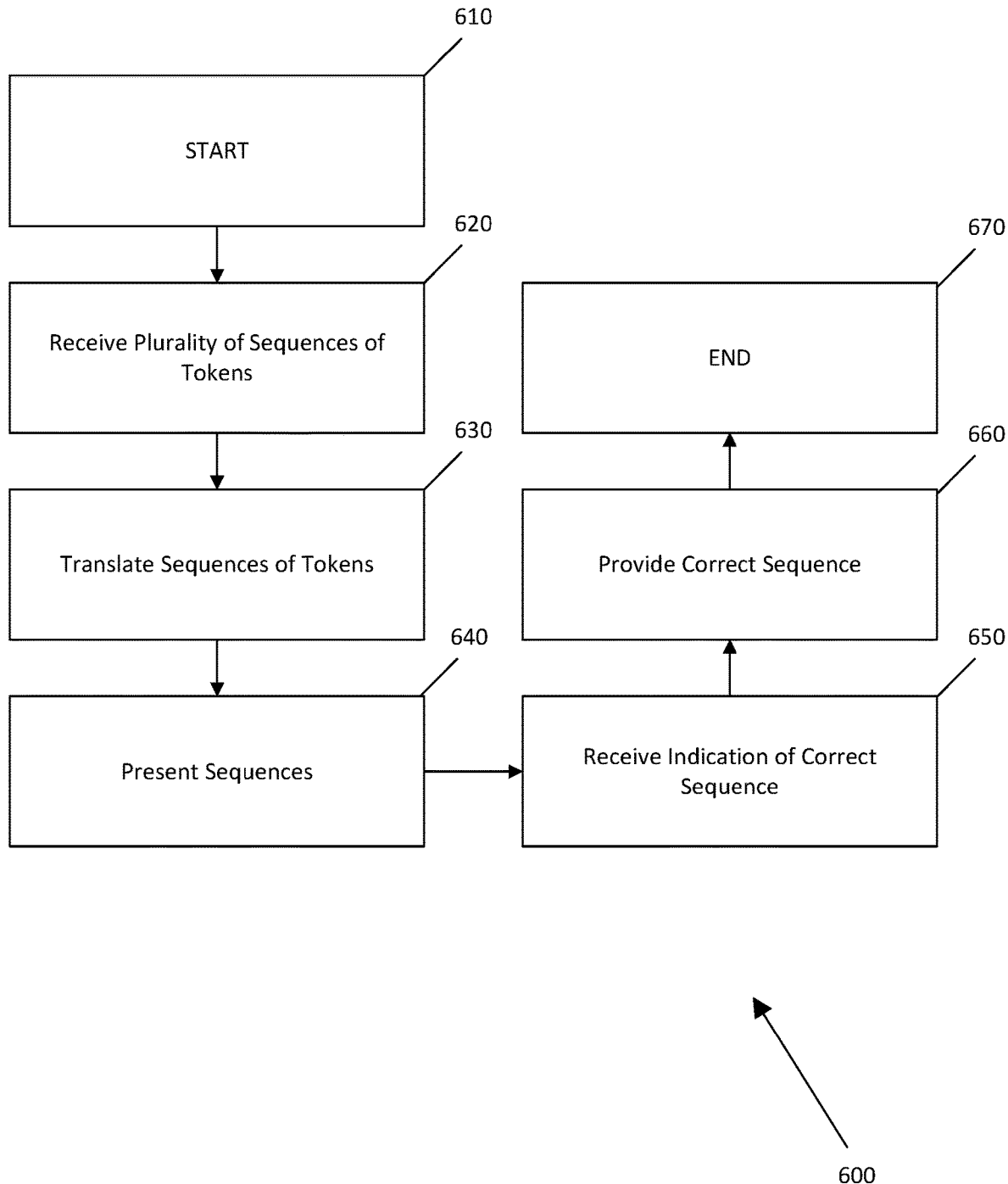
FIG. 6 is a flow chart illustrating an example method of disambiguating ecosystem operations described by natural language input.

Example Method of Disambiguating Ecosystem Operations Described by Natural Language Input FIG. 6 is a flow chart illustrating an example method 600 of disambiguating ecosystem operations described by natural language input.

As shown, the method 600 may begin at starting block 610 and proceed to stage 620 where a plurality of sequences of tokens is received. In some cases, two or more sequences of tokens may be received by a user experience orchestrator from a language model in response to natural language instructions sent from the user experience orchestrator to the language model. The two or more sequences of tokens may represent two or more sets of operations determined to have a likelihood of producing a correct result when executed in the domain specific language of the ecosystem.

From stage 620 where the two or more sequences of tokens is received, the method 600 may proceed to stage 630 where the sequences of tokens are translated. In the case that two or more sequences of tokens have a high likelihood of producing a correct result when respective operations associated with the sequences of tokens are performed, descriptions of the respective operations associated with the two or more sequences of tokens can be generated and provided. A user interface may be displayed with a textual description such as: "Did you mean X, or Y," where X is a description of a first set of operations and Y is a description of a second set of operations. In some embodiments, the sequences of tokens may be translated to a translation including images in addition to or instead of text.

From stage 630 where the sequences of tokens are translated, the method 600 may proceed to stage 640 where the translations of the sequences of tokens are presented to the user, such as by being displayed on a graphical user interface of a web-enabled user device in electric communication with the user experience orchestrator.

From stage 640 where the translations of the sequences of tokens are presented to the user, the method 600 may proceed to stage 650 where an indication of the correct translation is received. For example, a user may make a selection on a smart phone or other user device by interacting with the translated description to indicate its correctness, thus providing an indication of the correctness of the corresponding sequence of tokens.

From stage 650 where the indication of the correct translation is received, the method 600 may proceed to stage 660 where the correct sequence of tokens is provided (e.g., to a token operator). The method 600 may include providing sequences of tokens corresponding to the translation for which an indication of correctness was received at stage 650. From stage 660 where the correct sequence of tokens is provided, the method 600 may conclude at ending block 670.

Example Method of Handling Destructive Ecosystem Operations

Figure 7:
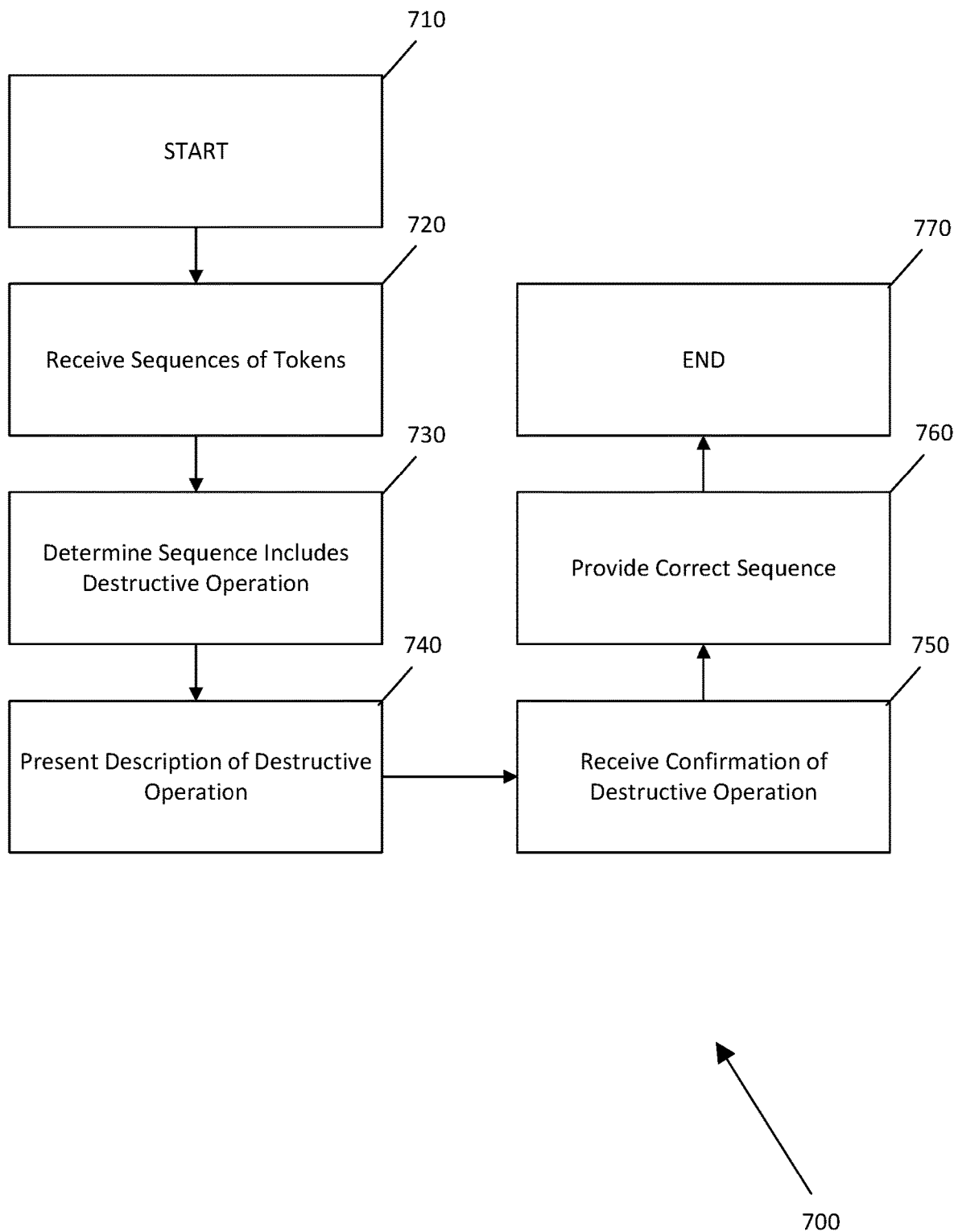
FIG. 7 is a flow chart illustrating an example method of special handling of destructive ecosystem operations.

FIG. 7 is a flow chart illustrating an example method 700 of handling destructive ecosystem operations.

As shown, the method 700 may begin at starting block 710 and proceed to stage 720 where a sequence of tokens is received. In various cases, a single sequence of tokens may be received, or multiple sequences of tokens may be received from a language model in response to natural language instruction input into the model.

From stage 720 where the sequence of tokens is received, the method 700 may proceed to stage 730 where it is determined that the sequence of tokens includes a destructive operation. In various embodiments, it may be determined that the sequence of tokens includes a consumptive operation, or an operation requiring confirmation. For destruction operations, consumptive operations, or operations requiring confirmation it may be desirable to insulate the operation from execution by requiring an additional user interaction before executing the operation.

From stage 730 where it is determined that the sequence of tokens includes a destructive operation, the method 700 may proceed to stage 740 where a description of the destructive operation is provided. For example, a translation of the operation into a natural language description may be presented to a user via a user computing device, such as a personal computer.

From stage 740 where the description of the destructive operation is provided, the method 700 may proceed to stage 750 where an indication of confirmation of the destructive operation is received. Upon viewing a description of the sequence of operations, the user can perform an interaction to confirm or not confirm, to provide indication whether the operation is valid, authorized, or confirmed. The operation may be a destructive or consumptive operation in some embodiments, but in other cases may be any operation for which user confirmation or validation is desired or beneficial.

From stage 750 where the indication of confirmation of the destructive operation is received, the method 700 may proceed to stage 760 where the correct sequence is provided. A sequence for which an indication, such as a confirmation or rejection, was received from a user may be provided along with the indication. However, if the indication is a rejection, the sequence of tokens need not be provided at all in some embodiments. If an indication of confirmation has been received for a sequence at stage 740, it is provided. If the sequence is not confirmed, a result including no sequence can be provided. In some cases, a description of an alternate, non-destructive sequence may be presenting to the user along with the description of the destructive operation, from which a user may select the non-destructive operation as the desired outcome, and that sequence may be provided. From stage 760 where the correct sequence is provided, the method 700 may proceed to conclude at ending block 770.

Example System for User Experience Orchestration using Natural Language

Figure 8:
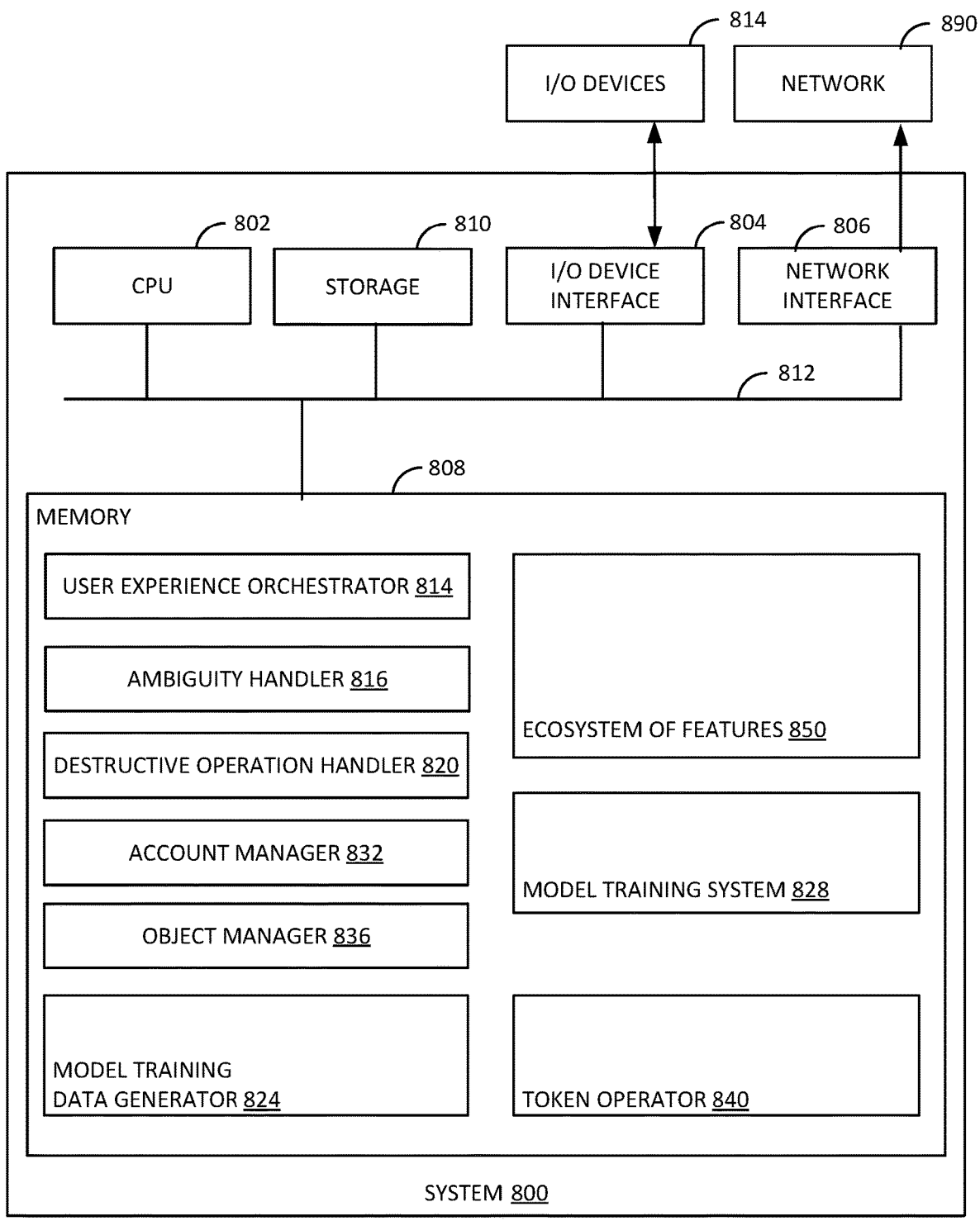
FIG. 8 illustrates an example system on which embodiments of the present disclosure can be performed, according to embodiments.

FIG. 8 illustrates an example system 800 on which embodiments of the present disclosure can be performed, according to embodiments.

FIG. 8 illustrates an example system 800 configured to perform the methods described herein, including, for example, operations of FIGS. 4-7. In some embodiments, system 800 may include a user experience orchestrator causing operations to be performed in an ecosystem in response to natural language instruction input. For example, a sequence of tokens corresponding to operations in the ecosystem and determined by a trained language model to correspond to the natural language instruction input can be determined and a user experience matching the result described by the natural language instruction is performed by the user experience orchestrator.

As shown, system 800 includes a central processing unit (CPU) 802, one or more I/O device interfaces 804 that may allow for the connection of various I/O devices 814 (e.g., keyboards, displays, mouse devices, pen input, etc.) to the system 800, network interface 806 through which system 800 is connected to network 890 (which may be a local network, an intranet, the internet, or any other group of computing devices communicatively connected to each other), a memory 808, storage 810 and an interconnect 812. The I/O devices 814 and/or network interface 806 may be used to receive a query in a natural language utterance through a "chatbot" application and output a response to the query generated based on extracting operators and operands from the natural language utterance.

CPU 802 may retrieve and execute programming instructions stored in the memory 808 and/or storage. Similarly, the CPU 802 may retrieve and store application data residing in the memory 808 and/or storage 810. In general, data may be transferred between memory 808 and storage 810. Optionally, storage 810 may be external storage connected to the system 800. The interconnect 812 transmits programming instructions and application data, among the CPU 802, I/O device interface 804, network interface 806, memory 808, and storage 810.

CPU 802 is included to be representative of a single CPU, multiple CPUs, a single CPU having multiple processing cores, and the like.

Memory 808 is representative of a volatile memory, such as a random access memory, or a nonvolatile memory, such as nonvolatile random access memory, phase change random access memory, or the like. As shown, memory 808 includes the user experience orchestrator 814, an ambiguity handler 816, a destructive operation handler 820, a model training data generator 824, a model training system 828, an account manager, 832, an object manager 836, a token operator 840, and an ecosystem of features 850.

In general, the user experience orchestrator 814 may be accessible via internet or may be on a local user device. A user can input natural language into the orchestrator 814 to receive a user experience matching the input. The ambiguity handler 816 enables a user to disambiguate between user experiences in the cases that more than one user experience correspond ambiguously to the input. The destructive operation handler 820 enables a user to verify or confirm operations before execution.

The model training data generator 824 can be used to generate training data, such as prompts and labels used to train a language model. The prompts and labels may be generated manually, may be generated synthetically or algorithmically, or may be generated via sampling. The prompts and labels can be used as training data input for the model training system 828.

The account manager 832 can manage accounts associated with the ecosystem of features 850. The object manager 836 can manage objects associated with the ecosystem of features 850, such as by storing or managing objects generated using features of the ecosystem 850.

The token operator 840 can be used to operate tokens by executing operations or functions associated with the ecosystem of features 850, for example, to cause accounts or objects associated with accounts to be created or managed by the account manager 832 and/or the object manager 836.

The ecosystem of features 850 can include suite of related applications enabling various features and/or functions known in the art.

Example Clauses

Aspect 1: A method, comprising: defining a plurality of tokens, the plurality of tokens each corresponding to one or more ecosystem operations of a universe of ecosystem operations, each ecosystem operation of the universe of ecosystem operations being associated with a command expressible in a domain specific language of a computing ecosystem and able to be executed in the computing ecosystem; receiving a natural language instruction describing a correct result of the computing ecosystem; determining, using a machine learning model trained based on a plurality of prompts describing particular results of the computing ecosystem and a plurality of labels corresponding to sequences of one or more tokens of the plurality of tokens, that one or more subsets of the natural language instruction correspond to one or more sequences of one or more tokens of the plurality of tokens; and selecting, from the one or more sequences of one or more tokens, a sequence of one or more tokens such that the correct result described by the natural language instruction is produced by the computing ecosystem by a sequence of operations corresponding to the sequence of one or more tokens when commands associated with the sequence of operations are executed in the domain specific language in the computing ecosystem.

Aspect 2: The method of Aspect 1, further comprising executing commands associated with the sequence of one or more tokens in the computing ecosystem using the domain specific language.

Aspect 3: The method of any of Aspects 1-2, further comprising: determining, using the machine learning model, one or more given subsets of the natural language instruction that correspond ambiguously to one or more possible tokens; and in response to determining the one or more given subsets of the natural language instruction correspond ambiguously to one or more possible tokens, presenting a prompt for clarification of the one or more given subsets of the natural language instruction that correspond ambiguously to the one or more possible tokens, the prompt providing a plurality of descriptions of the one or more possible tokens and prompting for a selection from the plurality of descriptions corresponding to the correct result.

Aspect 4: The method of any of Aspects 1-3, wherein one or more tokens of the plurality of tokens includes one or more of a set of optional parameters or a set of required parameters.

Aspect 5: The method of any of Aspects 1-4, wherein each operation of the universe of ecosystem operations comprises one or more of a plugin operation, a widget operation, or a service application programming interface (API) operation.

Aspect 6: The method of any of Aspects 1-5, further comprising determining that executing commands associated with the sequence of one or more tokens requires input, and prompting for the input.

Aspect 7: The method of any of Aspects 1-6, wherein selecting the sequence of one or more tokens comprises choosing a sequence of tokens having a highest probability of achieving the correct result.

Aspect 8: The method of any of Aspects 1-7, further comprising determining whether operations associated with the sequence of one or more tokens include a destructive operation and, in response to determining the operations include a destructive operation, generating a prompt for confirmation and waiting for confirmation before executing commands associated with the operations.

Aspect 9: A system, comprising: a memory having executable instructions stored thereon and a processor configured to execute the executable instructions to cause the system to: define a plurality of tokens, the plurality of tokens each corresponding to one or more ecosystem operations of a universe of ecosystem operations, each ecosystem operation of the universe of ecosystem operations being associated with a command expressible in a domain specific language of a computing ecosystem and able to be executed in the computing ecosystem; receive a natural language instruction describing a correct result of the computing ecosystem; determine, using a machine learning model trained based on a plurality of prompts describing particular results of the computing ecosystem and a plurality of labels corresponding to sequences of one or more tokens of the plurality of tokens, that one or more subsets of the natural language instruction correspond to one or more sequences of one or more tokens of the plurality of tokens; and select, from the one or more sequences of one or more tokens, a sequence of one or more tokens such that the correct result described by the natural language instruction is produced by the computing ecosystem by a sequence of operations corresponding to the sequence of one or more tokens when commands associated with the sequence of operations are executed in the domain specific language in the computing ecosystem.

Aspect 10: The system of Aspect 9, wherein the processor is further configured to cause the system to: determine, using the machine learning model, one or more given subsets of the natural language instruction that correspond ambiguously to one or more possible tokens; and in response to determining the one or more given subsets of the natural language instruction correspond ambiguously to one or more possible tokens, present a prompt for clarification of the one or more given subsets of the natural language instruction that correspond ambiguously to the one or more possible tokens, the prompt providing a plurality of descriptions of the one or more possible tokens and prompting for a selection from the plurality of descriptions corresponding to the correct result.

Aspect 11: The system of any of Aspects 9-10, wherein one or more tokens of the plurality of tokens includes one or more of a set of optional parameters or a set of required parameters.

Aspect 12: The system of any of Aspects 9-11, wherein each operation of the universe of ecosystem operations comprises one or more of a plugin operation, a widget operation, or a service application programming interface (API) operation.

Aspect 13: The system of any of Aspects 9-12, wherein the processor is further configured to cause the system to: determine that executing commands associated with the sequence of one or more tokens requires input; and prompt for the input.

Aspect 14: The system of any of Aspects 9-13, wherein selecting the sequence of one or more tokens comprises choosing a sequence of tokens having a highest probability of achieving the correct result.

Aspect 15: The system of any of Aspects 9-14, wherein the processor is further configured to cause the system to: determine whether operations associated with the sequence of one or more tokens include a destructive operation; and in response to determining the operations include a destructive operation, generate a prompt for confirmation and wait for confirmation before executing commands associated with the operations.

Aspect 16: A method, comprising: generating a training data set comprising: a plurality of prompts describing a particular result of a computing ecosystem, the computing ecosystem comprising a universe of ecosystem operations describing commands expressible in a domain specific language of the computing ecosystem and able to be executed in the computing ecosystem; and a plurality of labels corresponding to sequences of one or more tokens, each token of the sequences of one or more tokens corresponding to one or more operations of the universe of ecosystem operations; and training a machine learning model to generate one or more recommended sequences of tokens that achieve a selected result in the computing ecosystem based on the training data set, wherein the training of the machine learning model comprises: providing inputs to the machine learning model based on the plurality of prompts, receiving outputs from the machine learning model based on the inputs, and iteratively adjusting parameters of the machine learning model based on comparing the outputs to the plurality of labels.

Aspect 17: The method of Aspect 16, further comprising deploying the machine learning model.

Aspect 18: The method of any of Aspects 16-17, wherein the machine learning model comprises a large language model that was previously trained, and wherein the training of the machine learning model comprises fine tuning the machine learning model.

Aspect 19: The method of any of Aspects 16-18, wherein the machine learning model comprises a language model generated from the plurality of prompts and the plurality of labels.

Aspect 20: The method of any of Aspects 16-19, further comprising generating one or more synthetic prompts and one or more additional labels based on the training data set and one or more recommended sequences generated by the machine learning model.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
    generating a training data set comprising:
        a plurality of prompts describing a particular result of a computing ecosystem, the computing ecosystem comprising a universe of ecosystem operations describing commands expressible in a domain specific language of the computing ecosystem and able to be executed in the computing ecosystem; and
        a plurality of labels corresponding to sequences of one or more tokens, each token of the sequences of one or more tokens corresponding to one or more operations of the universe of ecosystem operations; and
    training a machine learning model to generate one or more recommended sequences of tokens that achieve a selected result in the computing ecosystem based on the training data set, wherein the training of the machine learning model comprises:
        providing inputs to the machine learning model based on the plurality of prompts, receiving outputs from the machine learning model based on the inputs, and iteratively adjusting parameters of the machine learning model based on comparing the outputs to the plurality of labels.

2. The method of claim 1, further comprising deploying the machine learning model.

3. The method of claim 1, wherein the machine learning model comprises a large language model that was previously trained, and wherein the training of the machine learning model comprises fine tuning the machine learning model.

4. The method of claim 1, wherein the machine learning model comprises a language model generated from the plurality of prompts and the plurality of labels.

5. The method of claim 1, further comprising generating one or more synthetic prompts and one or more additional labels based on the training data set and one or more recommended sequences generated by the machine learning model.

6. The method of claim 1, wherein the sequences of one or more tokens include one or more of a set of optional parameters or a set of required parameters.

7. The method of claim 1, wherein each operation of the universe of ecosystem operations comprises one or more of a plugin operation, a widget operation, or a service application programming interface (API) operation.

8. A system, comprising:
    one or more processors; and
    a memory storing instructions that, when executed by the one or more processors, cause the system to:
        generate a training data set comprising:
            a plurality of prompts describing a particular result of a computing ecosystem, the computing ecosystem comprising a universe of ecosystem operations describing commands expressible in a domain specific language of the computing ecosystem and able to be executed in the computing ecosystem; and
            a plurality of labels corresponding to sequences of one or more tokens, each token of the sequences of one or more tokens corresponding to one or more operations of the universe of ecosystem operations; and
        train a machine learning model to generate one or more recommended sequences of tokens that achieve a selected result in the computing ecosystem based on the training data set, wherein the training of the machine learning model comprises:

providing inputs to the machine learning model based on the plurality of prompts, receiving outputs from the machine learning model based on the inputs, and iteratively adjusting parameters of the machine learning model based on comparing the outputs to the plurality of labels.

9. The system of claim 8, wherein the instructions, when executed by the one or more processors, further cause the system to deploy the machine learning model.

10. The system of claim 8, wherein the machine learning model comprises a large language model that was previously trained, and wherein the training of the machine learning model comprises fine tuning the machine learning model.

11. The system of claim 8, wherein the machine learning model comprises a language model generated from the plurality of prompts and the plurality of labels.

12. The system of claim 8, wherein the instructions, when executed by the one or more processors, further cause the system to generate one or more synthetic prompts and one or more additional labels based on the training data set and one or more recommended sequences generated by the machine learning model.

13. The system of claim 8, wherein the sequences of one or more tokens include one or more of a set of optional parameters or a set of required parameters.

14. The system of claim 8, wherein each operation of the universe of ecosystem operations comprises one or more of a plugin operation, a widget operation, or a service application programming interface (API) operation.

15. A non-transitory computer readable medium comprising instructions that, when executed by one or more processors of a computing system, cause the computing system to:

generate a training data set comprising:
a plurality of prompts describing a particular result of a computing ecosystem, the computing ecosystem comprising a universe of ecosystem operations describing commands expressible in a domain specific language of the computing ecosystem and able to be executed in the computing ecosystem; and
a plurality of labels corresponding to sequences of one or more tokens, each token of the sequences of one or more tokens corresponding to one or more operations of the universe of ecosystem operations; and train a machine learning model to generate one or more recommended sequences of tokens that achieve a selected result in the computing ecosystem based on the training data set, wherein the training of the machine learning model comprises:

providing inputs to the machine learning model based on the plurality of prompts, receiving outputs from the machine learning model based on the inputs, and iteratively adjusting parameters of the machine learning model based on comparing the outputs to the plurality of labels.

16. The non-transitory computer readable medium of claim 15, wherein the instructions, when executed by the one or more processors, further cause the computing system to deploy the machine learning model.

17. The non-transitory computer readable medium of claim 15, wherein the machine learning model comprises a large language model that was previously trained, and wherein the training of the machine learning model comprises fine tuning the machine learning model.

18. The non-transitory computer readable medium of claim 15, wherein the machine learning model comprises a language model generated from the plurality of prompts and the plurality of labels.

19. The non-transitory computer readable medium of claim 15, wherein the instructions, when executed by the one or more processors, further cause the computing system to generate one or more synthetic prompts and one or more additional labels based on the training data set and one or more recommended sequences generated by the machine learning model.

20. The non-transitory computer readable medium of claim 15, wherein the sequences of one or more tokens include one or more of a set of optional parameters or a set of required parameters.

* * * * *